United States Patent [19]

Ellis, III

[11] Patent Number: 4,650,586
[45] Date of Patent: Mar. 17, 1987

[54] FLUID TREATMENT SYSTEM
[75] Inventor: George S. Ellis, III, Chardon, Ohio
[73] Assignee: Kinetico, Inc., Newbury, Ohio
[21] Appl. No.: 703,126
[22] Filed: Feb. 19, 1985

Related U.S. Application Data

[63] Continuation-in-part of Ser. No. 535,996, Sep. 26, 1983.
[51] Int. Cl.[4] ............................................ B01D 13/00
[52] U.S. Cl. ............................ 210/636; 210/257.2; 210/409
[58] Field of Search .............. 210/257.2, 321.1, 321.2, 210/636, 409

[56] References Cited

U.S. PATENT DOCUMENTS

| | | | |
|---|---|---|---|
| 3,493,495 | 2/1970 | Mendelson | 210/321.1 X |
| 3,493,496 | 2/1970 | Bray et al. | 210/321.1 X |
| 3,498,910 | 3/1970 | Mendelson | 210/321.1 X |
| 3,505,215 | 4/1970 | Bray | 210/321.1 X |
| 3,616,921 | 11/1971 | Bray | 210/321.1 X |
| 3,746,640 | 7/1973 | Bray | 210/321.1 X |
| 3,786,924 | 1/1974 | Huffman | 210/321.1 X |
| 3,846,295 | 11/1974 | Gibbs | 210/257.2 X |
| 3,849,305 | 11/1974 | Manjikian | 210/321.1 X |
| 3,939,074 | 2/1976 | Bray | 210/321.1 X |
| 3,959,146 | 5/1976 | Bray | 210/321.1 X |
| 3,992,301 | 11/1976 | Shippey et al. | 210/321.1 X |
| 4,124,488 | 11/1978 | Wilson | 210/416.1 X |
| 4,187,173 | 2/1980 | Keefer | 210/416.1 X |
| 4,190,537 | 2/1980 | Tondreau et al. | 210/321.1 X |

FOREIGN PATENT DOCUMENTS 2180436 11/1973 France .............................. 210/257.2

Primary Examiner—Frank Spear
Attorney, Agent, or Firm—Watts, Hoffmann, Fisher & Heinke Co.

[57] ABSTRACT

Apparatus and method for purifying a solvent such as water, using a reverse osmosis process. The apparatus includes a reverse osmosis (R.O.) unit, a storage tank for storing permeate produced by the reverse osmosis unit, and a flushing arrangement for cleansing the concentrate side of a reverse osmosis membrane at the conclusion of a purifying cycle. A flow regulating arrangement 34, 40, 42 maintains one of two pressures at the concentrate output. A system controller controls the communication of feed water to the R.O. unit and the concentrate pressure. A flushing accumulator receives permeate during a purifying cycle. When the cycle is terminated, the permeate stored in the accumulator is transferred to the input side of the R.O. unit and flushes the membrane. The permeate is driven from the accumulator by a feed water generated force exerted on the permeate by an isolated pressurization chamber forming part of the accumulator. According to a feature of this embodiment, the R.O. unit, the flushing accumulator and the system controller are integrated in a unitary package which is relatively maintenance free.

15 Claims, 7 Drawing Figures

FLUID TREATMENT SYSTEM

This is a continuation-in-part application of patent application Ser. No. 06/535,996 filed 09/26/83.

TECHNICAL FIELD

The present invention relates generally to fluid treatment systems and in particular to a method and apparatus for purifying water using the reverse osmosis principle.

BACKGROUND ART

Various methods and apparatus are known for purifying solvents, particularly water. One such method utilizes the principle of reverse osmosis to reduce or eliminate the quantity of dissolved solids in a liquid. According to the reverse osmosis principle, a semipermeable membrane is used to separate the solvent from the dissolved solids. For example, in purifying water, a membrane is selected that exhibits greater permeability to water than the dissolved solids carried by the water. Raw feed water is applied to the membrane at a pressure generally greater than the osmotic pressure of the water. Under pressure, water passes through the membrane leaving behind the dissolved solids. The liquid passing through the membrane is generally termed "permeate" whereas the liquid remaining on the input side of the membrane is generally termed "concentrate" and is usually discarded to drain.

Since the concentration of solutes increases on the concentrate side of the membrane during the reverse osmosis process, precipitation of one or more of the dissolved solids can occur. This precipitation can cause plugging of the membrane thus lowering the efficiency of the process. In some systems, plugging or compaction of the membrane is compensated for by increasing the pressure of feed water. In other systems, the feed water is fed at a relatively high flow rate to cause turbulence in the vicinity of the membrane. Those employing this arrangement believe that the turbulence prevents the solids from adhering to the membrane. With this method however, a rather large quantity of feed water is discharged as concentrate.

In some systems, the membrane is subject to a continuous pressure by the feed water even during periods of non-use. It is believed that the application of continuous pressure to the membrane reduces its useful life.

DISCLOSURE OF THE INVENTION

The present invention provides a new and improved apparatus and method for purifying water or other solvent, using the reverse osmosis principle. The apparatus includes a reverse osmosis (R.O.) unit, that houses a semipermeable membrane which, as is known in the art, separates incoming or "feed" fluid into "concentrate" and "permeate". The concentrate is normally discarded to drain or alternately is transferred to another processing device such as another R.O. membrane unit. The permeate is the purified solvent and is usually conveyed to a storage device and/or tap. In the preferred embodiment of the invention, the membrane is periodically cleansed with permeate and is subject to full operating pressure only during a purifying cycle. Once a predetermined quantity of permeate has been produced and stored, the pressure across the membrane is reduced or terminated.

In the preferred and illustrated embodiment, the membrane unit forming part of the purifying system includes an input for fluid to be treated, an output for concentrate and an output for permeate. In addition to the membrane unit, the system includes a flow regulator for maintaining a predetermined pressure at the concentrate output of the membrane unit, a storage device such as a tank for storing permeate under pressure and a flushing arrangement for transferring a quantity of permeate to the input side of the membrane unit at the conclusion of a process cycle, to cleanse and reduce the pressure differential across the membrane. A system controller monitors the system operation and terminates the flow of fluid to the membrane unit when a predetermined quantity of permeate has been stored and effects the cleansing and pressure reduction cycle for the membrane. In the preferred embodiment, an inlet valve under the control of the system controller, controls the communication of the source of fluid to be treated with the input to the membrane unit such that during a process cycle, the inlet valve is opened to communicate the source with the unit.

According to one preferred and illustrated embodiment, the storage device communicates with the permeate output of the membrane unit. In addition, the storage device communicates with the input to the unit through a valve, preferably a check valve, that prevents the flow of source to the tank but allows the flow of permeate from the tank to the input under certain operating conditions. In this embodiment, the flow controller includes a flow regulator and pressure relief valve serially disposed in the concentrate output line. A fluid bypass arrangement, under the control of the system controller is disposed in a parallel fluid flow relationship with the flow regulator such that when it is activated by the system controller, fluid bypasses the flow regulator and the concentrate output pressure is determined by the pressure relief valve. When the fluid bypass is disabled, the concentrate output pressure is then determined by the flow regulator.

In the preferred method of operation, the system controller initiates a purifying cycle by communicating the source of fluid to be treated with the input to the membrane unit. Concurrently, the fluid by-pass is deactivated so that the flow regulator becomes operative to maintain a predetermined concentrate output pressure. The process cycle continues until the storage tank is pressurized to a predetermined pressure level. The system controller monitors the storage pressure and in response to sensing the predetermined level, closes the inlet valve to terminate the communication between the source and the input, and concurrently activates the fluid bypass to disable the flow regulator to establish a different, preferably lower concentrate output pressure. The reduction of pressure at the concentrate output causes an additional quantity of concentrate to be discharged into the conduit from the membrane unit. Since the inlet valve is closed, permeate from the storage tank enters the input of the membrane unit to replace the quantity of concentrate that was discharged. In so doing, the concentrate side of the membrane is flushed with permeate and the pressure differential across the membrane is reduced.

With this arrangement, membrane plugging due to precipitation or compaction as well as membrane failure due to continuously applied fluid pressure, is substantially reduced. With the present invention, it is believed that process efficiency is maintained at a relatively high level throughout the life of the membrane.

In this disclosed embodiment, the fluid by-pass arrangement includes a fluid control valve that opens upon receiving a signal from the system controller and closes in the absence of the signal. For purposes of explanation, the valve will be referred to as an outlet valve. In the preferred embodiment; both the inlet and outlet valves are similarly constructed and are preferably pilot pressure operated. The system controller is connected to the valves and supplies the necessary fluid signals to either open or close the valves in response to sensed operating conditions. It must be recognized that other types of valves would also be suitable such as solenoid operated valves which would be activated by electrical signals supplied by an electrical system controller.

Another preferred embodiment of the solvent purifying system is also disclosed which includes a flush accumulator in addition to the storage device. According to this embodiment, permeate is fed to both the storage tank and the flush accumulator during a purifying cycle. When the storage tank is pressurized to its predetermined level, the system controller isolates the flush accumulator from the storage tank, terminates the communication of the source with the input to the reverse osmosis unit and communicates the flush accumulator with the input. Concurrently, the fluid bypass at the concentrate output is activated to reduce the output pressure to substantially zero thus causing further discharge of concentrate and a flow of permeate from the accumulator into the membrane unit. With this disclosed embodiment, at the conclusion of a purifying cycle, a predetermined amount of permeate, that is, the quantity stored in the flush accumulator is discharged into the membrane unit. Since the quantity of permeate entering the unit is limited by the amount stored in the flush accumulator, the concentrate output pressure can be reduced to substantially zero while still maintaining full storage tank pressure.

In accordance with this embodiment, a fluid pressure operated system controller controls the overall purifying process. The system controller includes an valve assembly that controls the communication of feed water to the membrane unit as well as the communication between the unit and the storage tank and flush accumulator.

In the preferred embodiment, the valve assembly includes a housing that slidably supports a valving member for movement between "on" and "off" positions. The valving member defines an inlet valve for controlling the communication of feed water with the membrane unit and a spool-like valve portion that controls the fluid communication between associated system control ports.

The valve assemby also includes a valve biasing member that cooperates with the valving member to define a differential piston arrangement. In the preferred embodiment, the biasing member is slidable on a shank defined by the valving member and defines an effective pressure area that is exposed to inlet pressure when the inlet valve opens. The valving member also defines a counter-effective pressure area exposed to storage tank pressure. A valve biasing spring, preferably captured by the biasing member exerts a valve opening force on the valving member when the member is in its "off" position. The spring force is selected to provide a force sufficient to drive the valving member to its "on" position when the storage tank pressure falls to a predetermined low level.

In accordance with the invention, the counter-effective pressure area defined by the valving member is larger than that defined by the biasing member so that a predetermined storage tank pressure, less than inlet pressure, will generate a valve closing force that is greater than the valve opening force (applied by inlet pressure through the biasing member). In the embodiment disclosed, the effective pressure areas on the valving member and the biasing member are configured such that a storage tank pressure of substantially ⅔ inlet pressure will produce a sufficient force on the valving member to move it to its "off" position to close the inlet valve and terminate a process cycle.

Once the inlet valve closes, the effective pressure area defined by the biasing member is isolated from the feed line pressure thus resulting in a substantial reduction in the biasing force tending to drive the valving member to its "on" position. The valving member remains "off" until the pressure in the storage tank is substantially decreased. In particular, the valve member remains "off" until the combination of inlet pressure on the inlet valve and the biasing force applied by the spring are sufficient to overcome the closure biasing force generated by the storage tank pressure. Once the inlet valve opens, inlet pressure acts on the biasing member driving it into engagement with the valving member thereby insuring that the inlet valve remains opened until the storage tank reaches the predetermined storage pressure as determined by the ratio between the effective pressure area defined by the valving member (to which storage tank pressure is applied) and the effective pressure area defined by the biasing member (to which inlet pressure is applied).

According to a feature of this embodiment, the system controller, the R.O. membrane and the flush accumulator form part of a unitary package that is relatively maintenance free. In the preferred and illustrated construction, the unit comprises a sealed canister-like housing that includes three fittings: one for a feed water input, one for permeate output and one for a drain connection through which concentrate and other waste water is discharged. The system controller is mounted at one end of the canister and controls the communication of feed water to an R.O. membrane located in a compartment within the canister as well as flushing of the membrane when a purifying cycle is terminated.

According to a feature of the invention, the flush accumulator is formed by an elastomeric member mounted around the membrane compartment. In the preferred embodiment, the member is tubular and is sealingly clamped inside the canister at both ends such that an inner expansible chamber is formed between an outside wall of the member and an inside wall of the canister and an outer chamber is formed between the outside of the membrane compartment and the inside of the elastomeric member.

The outer chamber forms the flushing accumulator and receives permeate from the membrane compartment, during a purifying cycle through a compartment output passage. The communication is terminated during the "off" cycle and the outer chamber is communicated with an input passage to the membrane compartment so that the permeate stored in the accumulator flushes the membrane. In one embodiment a provision is made for precharging or pressurizing the inner chamber so that the permeate is stored under pressure in the accumulator and is thus fully discharged at the conclusion of a process cycle.

In another embodiment, pressurization of the flush accumulator to effect discharge of the stored permeate at the conclusion of a purifying cycle is controlled by a pressure control valve. According to this embodiment, the flush accumulator includes a permeate storage chamber and a pressure chamber isolated from each other. The control valve controls the pressurization of the pressure chamber. In the illustrated embodiment, the valve includes a spool member shiftable between two positions. In one position, the pressure chamber is communicated with a drain connection which maintains substantially ambient pressure in the chamber, allowing the permeate storage chamber to completely fill with permeate. At the conclusion of a purifying cycle, the control valve shifts to communicate inlet pressure to the pressure chamber to produce a driving force for discharging the permeate. With this embodiment, all of the permeate is driven from the accumulator with a substantially uniform pressure, i.e., inlet pressure.

To achieve this feature, the spool member is defined by large and small diameter segments, each having a radial end face defining an effective pressure area. The smaller diameter end face is exposed to inlet pressure whereas the large diameter face is exposed to the pressure in the R.O. unit. Since the force generated by the R.O. unit pressure applied to the large diameter end face is greater than the force generated by inlet pressure on the small diameter end face, the spool member is maintained in a first position, during a purifying cycle, at which the pressure chamber is communicated with a drain connection. When the purifying cycle is terminated (upon a predetermined pressurization of the storage tank), the termination of pressure in the R.O. unit enables inlet pressure applied to the smaller diameter end face to drive the spool member to a second position at which inlet pressure is communicated to the pressure chamber of the flush accumulator. When a purifying cycle is reinitiated, the resulting pressure developed in the R.O. module communicated to the spool, shifts the spool to the first position, thus depressurizing the pressure chamber in the accumulator.

Additional features will become apparent and a fuller understanding obtained by reading the following detailed description made in connection with the accompanying drawings.

BEST MODE FOR CARRYING OUT THE INVENTION

Figure 1:
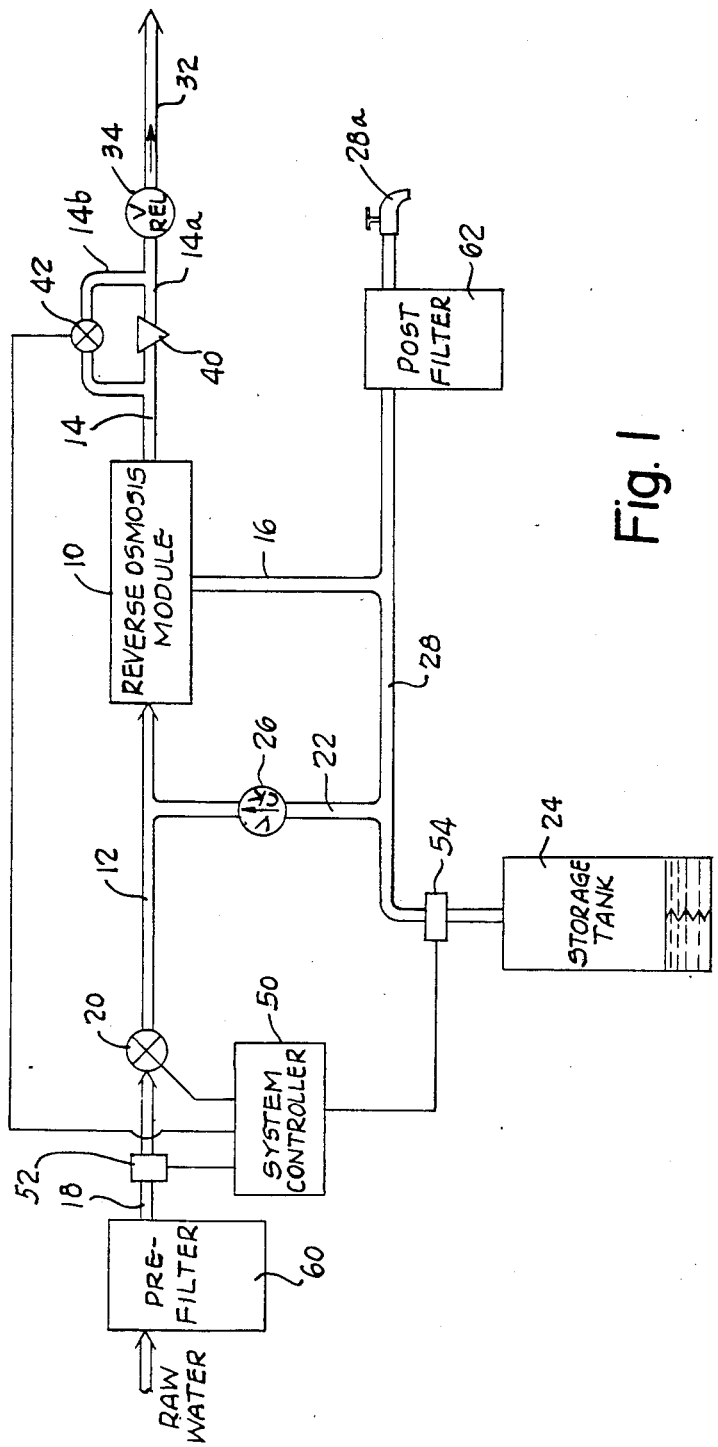
FIG. 1 is a diagrammatic representation of a solvent purifying system, utilizing the reverse osmosis principle, that is constructed in accordance with a preferred embodiment of the invention.

FIG. 1 schematically illustrates one preferred construction of a solvent purifying system embodying the present invention. For purposes of explanation, the disclosed apparatus and method will be described as a water purifying process and system. Those skilled in the art should recognize that the invention is applicable to the purification of solvents in general by reverse osmosis.

The system includes a reverse osmosis module 10 connected to an input conduit 12 through which feed water to be purified is communicated to the module. The module also communicates with output conduits 14, 16 through which "concentrate" and "permeate" are discharged, respectively, from the module. The module 10 operates in a conventional manner and includes a semipermeable membrane (not shown). According to the reverse osmosis principle, feed water supplied through the conduit 12 is applied to the membrane at a pressure greater than the osmotic pressure. Water passes through the membrane while dissolved solids in the feed water remain on the application side of the membrane and are eventually discharged into the concentrate conduit 14. The "permeate" is released into the permeate conduit 16.

As seen in FIG. 1, raw feed water is fed to the system through a conduit 18. A valve 20 controls the communication of the conduit 18 with the input conduit 12. A branch conduit 22 connects a pressurized storage tank 24 with the conduit 12. A check valve 26 disposed in the conduit 22 allows fluid flow from the storage tank 24 to the conduit 12 but prevents reverse flow.

The permeate conduit 16 communicates with a supply conduit 28 that includes a tap 28a. The supply conduit 28 is connected to the branch conduit 22 and also feeds permeate to the tank 24.

The concentrate output conduit 14 includes branch conduits 14a, 14b which merge together into a discharge conduit 32 that includes a pressure relief valve 34. The discharge conduit 32 normally dumps the concentrate to waste or drain (not shown). Alternately, as is known in the art, the conduit 32 may be connected to another solvent treatment apparatus, such as a second reverse osmosis unit to separate additional solvent from the concentrate.

The conduits 14a, 14b and pressure relief valve 34 form part of a flow controlling arrangement for maintaining predetermined pressures in the concentrate conduit 14. The concentrate branch conduit 14a includes a flow regulator 40 which is operative to maintain a predetermined pressure in the concentrate discharge line 14 thereby maintaining a predetermined back pressure in the reverse osmosis module. In general the pressure maintained by the flow regulator 40 is selected to produce a desired permeate quality and permeate quantity from the R.O. module.

The branch line 14b includes a control valve 42. As seen in FIG. 1, when the valve 42 is closed, the concentrate in the output conduit 14 is forced to pass through the flow regulator 40. When the valve 42 is open, the concentrate bypasses the flow regulator and flows directly to the discharge conduit 32. The pressure relief valve 34 in the discharge conduit 32 maintains a predetermined pressure in the output line 14 when the valve 42 is open. The relief setting of the valve 34 is adjusted to be slightly less than the pressure maintained by the flow regulator 40 so that when the valve 42 opens, the pressure in the concentrate output line 14 is reduced.

A system controller 50 controls the operation of the valves 20 and 42. According to the invention, the controller 50 opens or closes the valves 20, 42 in response to predetermined sensed pressures in the storage tank 24. Preferably, the controller 50 includes an arrangement for monitoring the feed water and storage tank pressures, shown schematically as sensors 52, 54. In the preferred embodiment, the control module 50 activates and deactivates the valves 20, 42 in response to sensing a predetermined pressure differential between the feed water and the storage tank 24.

The overall system operates as follows. When the storage tank 24 is empty, a rather large pressure differential is sensed between the feed water conduit 18 and the tank. At this sensed pressure differential, the control module 50 opens the valve 20 to allow feed water to enter the reverse osmosis module 10 via the conduit 12. Substantially concurrently with the opening of the valve 20, the valve 42 is closed so that concentrate in the conduit 14 is forced to pass through the flow regulator 40. With the flow regulator 40 in the flow path, a predetermined back pressure is maintained in the reverse osmosis module 10 rendering the unit operative to separate the feed water entering the module into concentrate and permeate. The permeate leaves the reverse osmosis module through the conduit 16 and assuming that the tap 28a is closed, the permeate enters the storage tank 24 by way of the conduit 28.

As the storage tank fills, the pressure rises. When the pressure in the tank 24 reaches a predetermined level which preferably is a function of the feed water pressure (such as a percentage of feed water pressure), the controller 50 deactivates the valve 20 to terminate the flow of feed water to the reverse osmosis module while simultaneously opening the valve 42 so that concentrate in the line 14 bypasses the flow regulator 40. As indicated previously, the pressure setting of the relief valve 34 is set below the control pressure of the flow regulator 40 so that the pressure in the concentrate discharge line 14 is reduced. This reduction causes some fluid flow out of the reverse osmosis module 10 through the pressure relief valve 34. Since the valve 20 is closed, the discharge of additional concentrate into the line 32 is compensated for by an equal amount of fluid flow into the R.O. unit from the storage tank 24, through the check valve 26 via the input conduit 12.

The permeate enters the reverse osmosis module and cleanses the membrane therein. In addition, the reduction of pressure in the concentrate line reduces the pressure differential across the membrane. Both of these factors reduce the stress level on the membrane and thus promote longevity.

When the volume in the storage tank 24 drops to a predetermined low level, the system controller sensing a resulting predetermined low pressure, reactivates the system. The valve 20 is opened to communicate feed water to the R.O. module and the valve 42 is closed so that the conduit 14 is repressurized to its operating pressure.

In the preferred system, a prefilter 60 is disposed in the feed water conduit 18 to filter out entrained solids and thus reduces the incidence of membrane plugging. A post filter 62 is preferably disposed in the outlet conduit 28 and reduces the trace amounts of impurities that pass through the membrane and may for example be simply a charcoal canister and act as a taste and odor enhancer.

The valves 20 and 42 are preferably pilot pressure operated and are opened and/or closed by the communication of fluid pressure from the system controller 50. Alternately, the valves may be opened by the communication of fluid pressure from the controller and closed in the absence of pilot pressure by a spring. The valves 20, 42 can also be electrically operated by an electronic system controller. Other arrangements including pneumatic or hydraulic valves and controllers are also contemplated. It should also be recognized that the pressure relief valve 34 can be replaced by other devices or valve arrangements.

Figure 2:
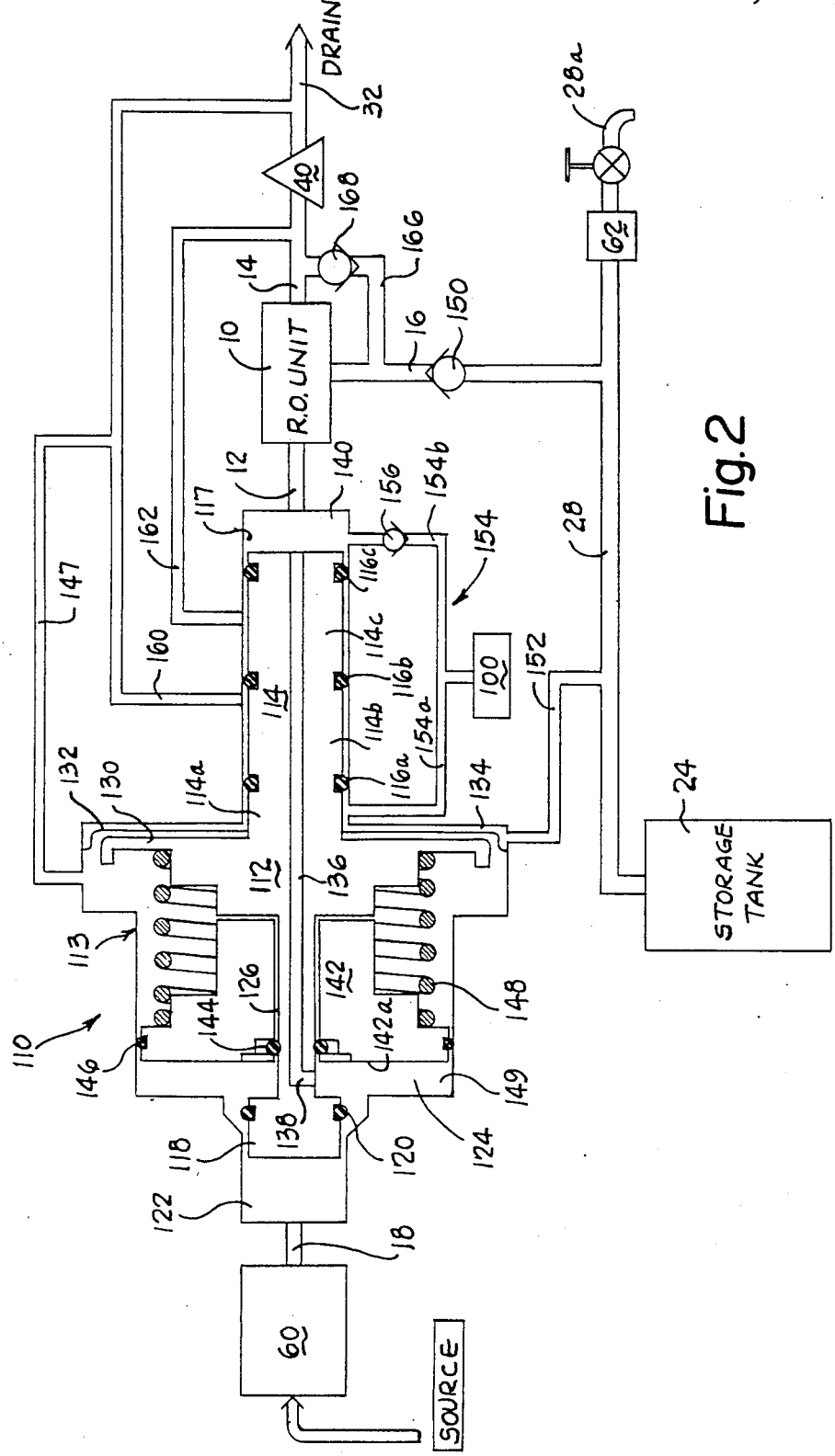
FIG. 2 is a diagrammatic representation of another embodiment of the solvent purifying system.

FIG. 2 schematically illustrates another preferred embodiment of the purifying system. To facilitate the description, components substantially similar to those disclosed and described in connection with FIG. 1, are denoted by like characters. It should also be noted that the components are not proportionately dimensioned in order to clarify the construction details of certain of the elements. Like the system disclosed in FIG. 1, the system shown in FIG. 2 includes an R.O. module 10 that receives feed water through an input conduit 12 and discharges concentrate and permeate into conduits 14 and 16. A flow regulator 40 pressurizes the concentrate conduit 14 during a purifying cycle. The supply conduit 28 communicates with the conduit 16 and supplies permeate to the pressurized storage tank 24 and the tap 28a. Pre and post filter elements 60, 62 are also included to treat the feed water and permeate, respectively, as described above.

Unlike the embodiment shown in FIG. 1, the R.O. module is flushed with permeate stored in a separate flush accumulator 100, at the conclusion of a process cycle. With this system configuration, a controlled amount of permeate (that stored in the accumulator) is transferred to the input side of the R.O. membrane (not shown in FIG. 2) when a purifying cycle is terminated.

The overall operation of the system is controlled by a fluid pressure operated system controller, indicated generally by the reference character 110. The controller includes a valve member 112 reciprocally mounted within a controller housing 113. The member is movable between "on" and "off" positions. In the "on" position (shown in FIG. 2), raw feed water is communicated to the R.O. unit 10 and permeate from the R.O. unit is communicated to the flushing accumulator 100 (and storage tank 24). In the "off" position, the flow of feed water to the R.O. unit is terminated and the flushing accumulator is isolated from the permeate output of the R.O. unit and is instead communicated with the input to the R.O. unit. Finally, the controller also controls the pressurization of the concentrate conduit 14. In the "on" position, the flow regulator 40 is enabled, thus pressurizing the conduit 14. In the "off" position, the regulator 40 is by-passed in order to reduce or terminate pressurization of the conduit 14 and hence the membrane in the R.O. unit.

To accomplish these functions, the valving member includes a spool portion 114 that is divided into three fluid flow controlling segments 114a, 114b, and 114c, by O-rings 116a, 116b, 116c. The spool portion is slidable in a bore 117 formed in the housing 113 with which a plurality of fluid ports (not shown) communicate. The control ports, in turn, communicate passages and conduits with the bore 117 and hence the spool portion 114 controls the fluid communication between the passages. The opposite end of the valving member defines a cylindrical inlet valve element 118 that carries an O-ring 120. The inlet valve 118 is reciprocally movable in a bore 122 defined by the valve controller housing 113. When the spool moves to its leftward position (as viewed in FIG. 2), the O-ring 120 sealingly engages the bore 122 and terminates the flow of feed water from the conduit 18 into the controller. In the rightward position, as shown in FIG. 2, feed water is allowed to proceed from the conduit 18 into the region designated by the reference character 124. The inlet valve 118 is connected to the remainder of the valving member 112 by a shank 126. The member 112 also includes an enlarged diameter portion 130 intermediate the inlet valve 118 and the spool portion 114. A diaphragm 132 sealingly engages the housing 113 and the valving member to define an isolated fluid flow region 134 between the housing 113 and the enlarged diameter portion 130.

An axial passage 136 and a connecting radial passage 138 communicates the valve region 124 with an end bore 140 defined between the right end of the spool portion 114 and the bore 117. A biasing member or piston 142 is slidable along the shank 126 and includes O-rings 144, 146 which sealingly engage the shank 126 and the inside of the valve housing 113. A biasing spring 148 is captured between the piston 142 and the enlarged diameter portion 130. The region beteween the biasing piston 142 and the enlarged diameter portion 130 of the valving member is vented to drain through a conduit 147. The conduit 147 prevents this region from pressurizing which would hinder relative movement between the piston 142 and the valving member 112.

In FIG. 2, the system controller is shown in its "on" mode, that is, the position it assumes when the system is in a purifying cycle. Just prior to the opening of the inlet valve, the biasing piston 142 is located at its leftmost position against a shoulder 149, formed in the housing. As the inlet valve opens, feed water entering the region 124 generates a substantial force on a left face 142a of the piston and eventually overcomes the spring force and drives the biasing piston 142 to its right most position, shown in FIG. 2, thereby driving the valving member 112 to its right most position (shown in FIG. 2), thus fully opening the inlet valve 118.

In the position shown in FIG. 2, feed water from the conduit 18 is communicated to the input conduit 12 of the R.O. module 10 by the passages 136, 138 formed in the shank 126. Permeate produced by the R.O. unit is discharged into the supply conduit 28 via the conduit 16 and a check valve 150. The check valve 150 allows unimpeded flow of permeate from the R.O. unit to the conduit 28 but prevents reverse flow. The supply conduit 28 not only supplies the storage tank 24 with permeate but also feeds a branch conduit 152 that communicates permeate to the accumulator 100. In particular, the conduit 152 communicates with the region 134 defined between the diaphragm 132 and the housing 113 which in turn is communicated to an accumulator feed conduit 154 having input/output portions 154a, 154b by the segment 114a of the spool portion. The conduit portion 154b also communicates with the end bore 140 through a check valve 156.

In general, the permeate pressure is less than the pressure of feed water and thus the check valve 156 prevents permeate from entering the end bore 140, during a purifying cycle. The permeate flowing to the accumulator via the branch conduit 152, the region 134 and the conduit 154 also applies a biasing force to the enlarged diameter portion 130, urging the spool portion 114 towards the left (as viewed in FIG. 2). Since the diameter against which the permeate pressure is applied is substantially larger than the diameter of the biasing piston 142, a permeate pressure less than feed water pressure will produce a force on the valving member 112 sufficient to overcome the force exerted by feed water on the biasing piston 142. When the force generated by permeate is greater than that generated by the feed water, the valving member 112 will be driven leftwardly to terminate the flow of feed water from the conduit 18 into the region 124 thus putting the system controller in an "off" state and terminating the purifying cycle. The permeate pressure that will produce this leftward movement in the valving member 112 is determined by the ratio between the effective pressure area of the enlarged diameter portion 130 and the area 142a of the biasing piston 142. In the embodiment illustrated, the ratio of areas is approximately two-thirds so that a permeate pressure equal to $\frac{2}{3}$ line pressure will effect closure of the valving member 112.

When the valving member shifts to the left, the O-ring seal 116a will terminate the communication between the diaphragm enclosed region 134 and the flush accumulator supply conduit 154. The segment 114c will be positioned between and hence fluidly interconnect a pair of by-pass conduits 160, 162. As a result, the concentrate conduit 14 will be depressurized since concentrate will be able to by-pass the flow regulator 40 through the branch conduits 160, 162 thus completely depressurizing the concentrate side of the R.O. unit and discharging concentrate to the drain conduit 32. Since the flushing accumulator 100 contains a pressurized source of permeate, the reduction in pressure in the input conduit 12 that results when additional concentrate is discharged to drain, will enable permeate to flow through the check valve 156 into the end bore 140 and into the R.O. unit 10 via the conduit 12. This flow of permeate flushes the R.O. unit. The permeate side of the R.O. unit is depressurized through a by-pass conduit 166 that includes a check valve 168. During a purifying cycle the pressurization of the conduit 14 prevents the flow of permeate through the check valve 168. However, once the cycle has been terminated and the pressure reduced in the conduit 14, any residual permeate pressure in the conduit 16 will be discharged through the conduit and check valve 166, 168.

Figure 3:
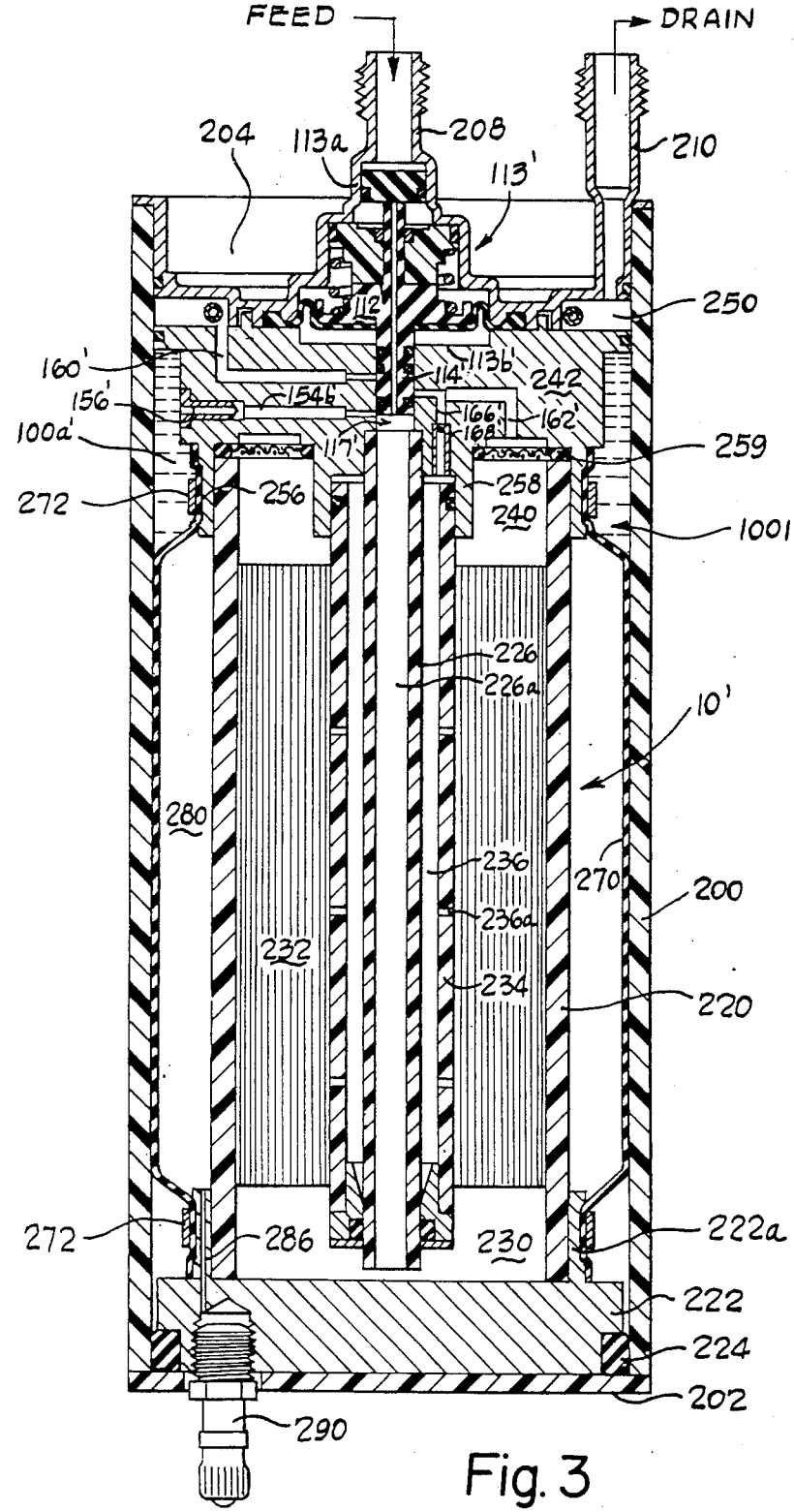
FIG. 3 is a sectional view of an apparatus that embodies the system illustrated schematically in FIG. 2 showing a system controller in an "off" position and as seen from the plane indicated by the line 3—3 in FIG. 5.
Figure 4:
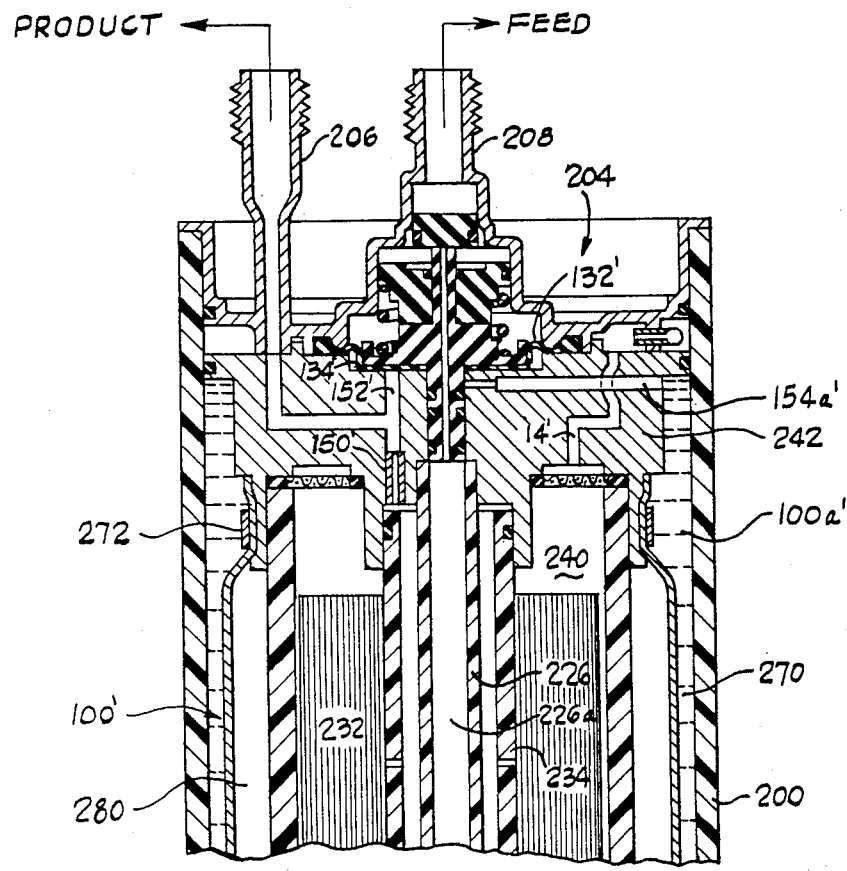
FIG. 4 is a fragmentary sectional view of the apparatus shown in FIG. 3, illustrating the "on" position for the system controller and as seen from the plane indicated by the line 4—4 in FIG. 5.
Figure 5:
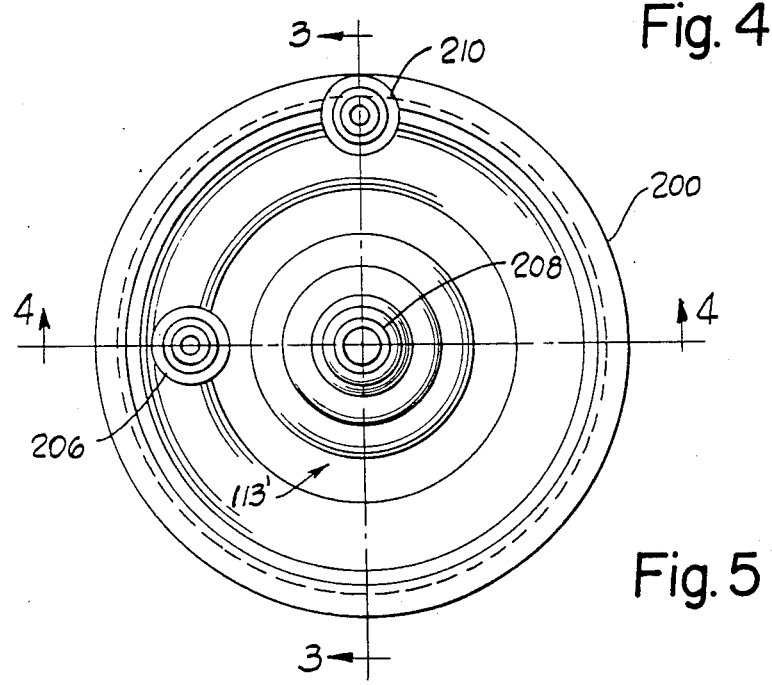
FIG. 5 is an end view of the apparatus shown in FIG. 3.

Turning now to FIGS. 3–5, an assembly is illustrated which embodies the invention shown schematically in FIG. 2. The assembly comprises a cartridge which mounts and integrates the individual components shown in FIG. 2 such as the R.O. unit and the system controller labeled 10 and 110 in FIG. 2. In order to facilitate the description, components and passages in the cartridge assembly which correspond to individual components and conduits in FIG. 2 are accorded the same reference character suffixed by an apostrophe ('). For example, the system controller indicated by the reference character 110 in FIG. 2 is indicated by the reference character 110' in FIGS. 3 and 4. In addition, some of the passages illustrated in the sectional views of the cartridge, are shown slightly out of position, in order to facilitate the description.

As seen best in FIG. 5, the canister-like assembly is substantially cylindrical. Referring also to FIGS. 3 and 4, the assembly includes a cylindrical, outer housing wall 200, a bottom end cap 202 and a top end cover indicated generally by reference character 204. The top cover 204 defines integral, threaded fittings 206, 208 and 210. Permeate is discharged through the fitting 206 and typically would be connected to a storage tank (element 24 in FIG. 2) and/or a tap (element 28a in FIG. 2). A source of raw feed water is connected to the fitting 208 whereas the fitting 210 is connected to drain.

As seen best in FIG. 3, an R.O. unit indicated generally by the reference character 10' is located centrally within the cartridge. The R.O. unit is a substantially sealed compartment having fluid connections to other parts of the cartridge assembly. The compartment comprises a cylindrical wall 220 mounted centrally within the outer housing wall 200. The lower end of the wall 220 (as viewed in FIG. 3) is sealingly received by a base 222 that includes an upwardly extending axial flange 222a. The base in turn sealingly engages the outer wall 200 and the end cap 202 through an O-ring 224. A feed tube 226 defining a feed passage 226a extends centrally and communicates a bore 117' with a region 230 that forms the input side of a reverse osmosis membrane 232. As is conventional, the membrane 232 is rolled and sealingly engages the inside of the wall 220. The membrane 232 is rolled around a perforate collector tube 234 that surrounds the feed tube 226 and defines a passage 236 for receiving permeate. In operation, the feed water, under pressure, enters the lower end of the rolled membrane. Permeate travels radially and enters the receiving passage 236 through perforations 236a in the collector tube. Concentrate travels axially through the entire membrane roll and is received in a concentrate collection chamber 240.

An intermediate housing member 242 is located just below the top cover 204 and sealingly engages the inside of the outer housing wall 200. The intermediate housing member defines a lower portion 113b' of the valve housing 113' and a plurality of passages which communicate other parts of the assembly with the valve 110', the R.O. unit 10' and the fittings 206, 208, 210. The intermediate housing member also mounts check valves 150', 156' and 168' which correspond to the check valves 150, 156 and 168 on FIG. 2.

A spool portion 114' of the valve member 112' is slidably received in the bore 117' formed in the intermediate housing member 242. A drain region 250 is defined between the intermediate member 242 and the top cover 204 and communicates with the drain connection 210. A by-pass passage 160' connects the drain region with the bore 117'. The spool portion 114 controls the communication of the passage 160' with another by-pass passage 162'. As seen in FIG. 2, during a purification cycle the concentrate output of the R.O. unit is pressurized or restricted by the flow regulator 40. In the embodiment illustrated in FIGS. 3–5, the flow restriction is provided by a length of capillary tube 40' which restricts the flow of concentrate from the passage 14' to the drain region 250. It should be recognized that the length of the tube 40' can vary and that the tube itself can be replaced by other types of flow restrictors.

The intermediate housing member 242 includes two concentric, downwardly depending axial flanges 256, 258. The flange 256 receives the membrane compartment wall 220 whereas the inner flange 258 receives the collector tube 236. The annual space defined between the flanges 256, 258 forms the concentrate receiving collection chamber 240. In the embodiment illustrated, a filter disk 259 is disposed at the upper end of the concentrate receiving region 240 and filters the concentrate prior to entering the discharge passage 14' (shown in FIG. 4) and the bypass passage 162' (shown in FIG. 3).

The flushing accumulator is indicated generally by the reference character 100' in FIGS. 3 and 4. The accumulator comprises an elastomeric, tubular bladder-like element 270, the ends of which are clamped to the outside of the flanges 256 and 222a by band clamps 272. As seen in FIG. 4, the region between the outside of the bladder and the inside of the housing wall 200 (indicated by the reference character 100a') receives permeate through a spool controlled passage 154a' formed in the intermediate housing member 242. When the valve 110 is in its "on" position as shown in FIG. 4, permeate travels from the receiving passage 236 to the passage 154a' by way of the check valve 150', the passage 152' and the region 134' defined between the diaphragm 132 and the valve housing.

In order to store the permeate in the flushing accumulator 100' under pressure, a region 280 defined between the inside of the bladder 270 and the outside of the membrane compartment wall 220 is pressurized with a suitable gas such as nitrogen. A fitting 290 (shown in FIG. 3) threadedly received in the base 222 communicates with the region 280 through a short passage 286 formed in the base and flange 222, 222a.

As seen in FIG. 3, when the system control 110' is in its "off" position, the valving member 112' is in its upper most position. Referring also to FIG. 4, with the spool portion 114' in the upper position (shown in FIG. 3), the concentrate receiving region 240 is communicated directly to the drain region 250 by way of the spool controlled by-pass passages 160', 162'. In residual permeate pressure in the permeate receiving passage 236 is also discharged to drain through a check valve 168' and passage 166' while communicating with the by-pass passage 162'. As seen in FIG. 3, with the valving member 112' in its uppermost position, the passage 154b' is communicated with the bore 117' and hence the feed tube passage 226. As a result, permeate is forced from the flushing accumulator 100' by the bladder 270 and into the feed tube 226 by way of a passage 154b' and check valve 156'.

Figure 6:
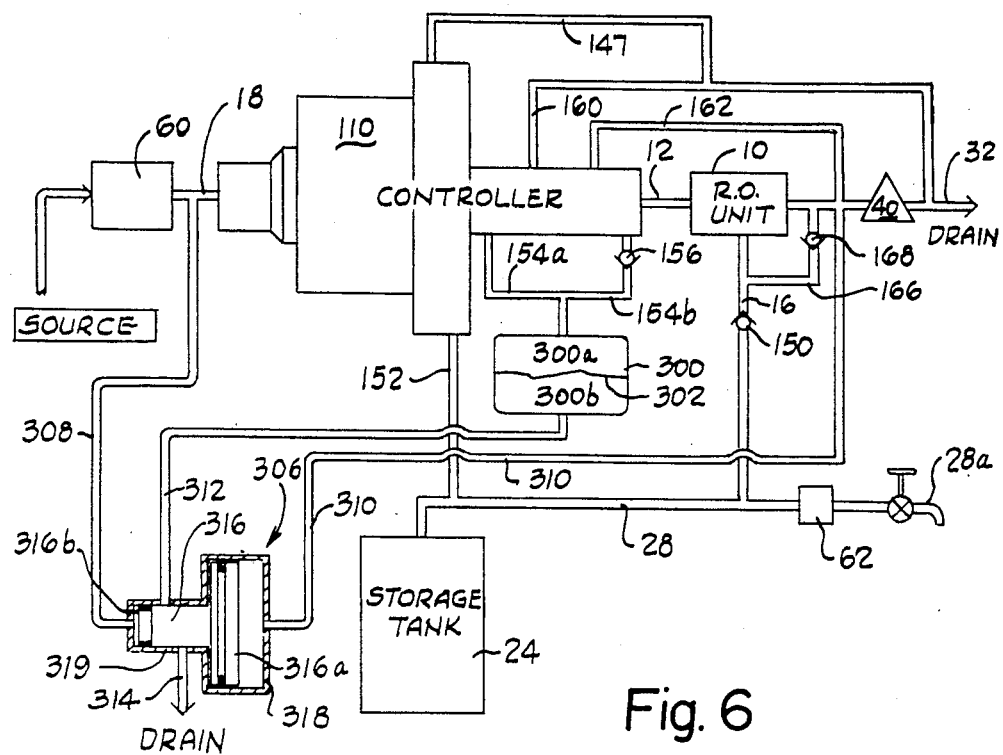
FIG. 6 is a diagrammatic representation of another embodiment of the solvent purifying system.
Figure 7:
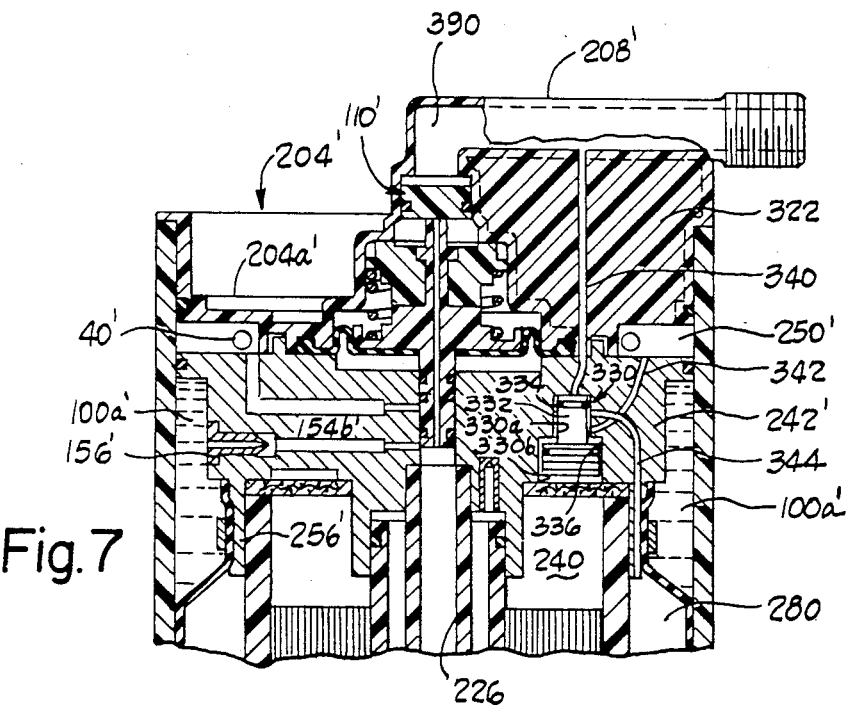
FIG. 7 is a fragmentary, sectional view of an apparatus that embodies the system illustrated schematically in FIG. 6.

Turning now to FIGS. 6 and 7, an alternate method for driving the permeate from the flush accumulator at the conclusion of a purifying cycle is illustrated. In the embodiment illustrated in FIGS. 1–5, the driving force for the permeate is stored gas pressure. In the embodiment illustrated in FIG. 3, a chamber 280 is defined between the bladder 270 and the membrane compartment which is precharged with a suitable gas such as nitrogen. It should be apparent that as the flushing accumulator 100' fills with permeate, the region 280 is compressed thus increasing the overall gas pressure. Once the gas pressure equals the pressure of the permeate, the flow of permeate into the flushing accumulator ceases. It should also be apparent that the initial quantity of permeate discharge at the conclusion of a purifying cycle is driven from the accumulator with a greater force than the final quantity of permeate because the pressure in the region 280 decreases as the region expands.

The purifying system illustrated schematically in FIG. 6 eliminates the need for precharging the flush accumulator with a gas. To facilitate the description, the elements of the system that are common to the system illustrated in FIG. 2 are designated by like characters. The system includes a flush accumulator 300 which includes a permeate accumulating chamber 300a and a driving or pressure chamber 300b separated by a flexible diaphragm 302. The pressurization and depressurization of the driving chamber 300b is controlled by a flushing control valve 306. The control valve 306 is connected to inlet pressure by a conduit 308, to the R.O. unit pressure by a conduit 310, to the driving chamber 300b of the flush accumulator 300 by a conduit 312 and to a drain connection by a conduit 314. A spool member 316 is shiftable between two positions in a control valve housing 318. The spool 316 controls the communication between the inlet pressure conduit 308, the driving chamber conduit 310 and the drain conduit 314. When the spool member is in its leftmost position, as shown in FIG. 6, the conduit 312 is communicated with the drain conduit 314 so that the driving chamber 300b of the flush accumulator 300 is completely depressurized and at ambient pressure. In the valve shown, the flow path between the conduit 312 and the drain conduit 314 (when the spool 316 is in the leftmost position) is established by a clearance 319 between the spool and the inside of the housing 318. When in this state, the flush accumulator 300 fills substantially completely with permeate.

During a purifying cycle, the output pressure of the R.O. unit is substantially the same as the inlet fluid pressure since the flow rates are relatively small. This output pressure communicated to the right radial face 316a of the spool 316, by the conduit 310, exerts a substantial force on the member 316 urging it towards the left. This force is opposed by a force exerted on a left radial face 316b of the spool 316 by inlet feed pressure communicated via the conduit 308. Since the right radial end face 316a is substantially larger than the left radial face 316b and substantially equal fluid pressures are applied to both, the net force maintains the spool 316 in the leftmost position during a purifying cycle. As explained earlier, once a predetermined amount of permeate is stored in the storage tank 24, the controller 110 shifts to terminate the communication between the inlet conduit 18 and the R.O. unit 10. As described above, the controller also interconnects the conduits 160, 162 to immediately depressurize the concentrate side of the R.O. unit. Consequently, the pressure in the conduit 310, connected to the flush control valve 306 is also depressurized, reducing or eliminating the fluid pressure generated force on the right radial face 316a of the spool member 316. The inlet feed pressure communicated to the left end face 316b by the conduit 308 then becomes effective to shift the spool 316 to the right, sealing the drain conduit 314 from the drive chamber conduit 312. The inlet pressure line 308 is concurrently connected with the actuating chamber line 312, thus pressurizing the driving chamber 300b of the flushing accumulator 300 causing discharge of the stored permeate into the input of the R.O. unit via the conduit 154b and the controller 110 as explained above. It should be apparent, that the force with which the permeate is forced from the chamber is substantially constant since inlet pressure under normal conditions is relatively constant. With this embodiment, complete discharge of the permeate from the chamber 300 is assured.

In the preferred construction of this embodiment, the pressure sensing conduit 310 is connected to the concentrate side of the R.O. unit. It should be noted that alternately the conduit 312 can be connected to the input side of the R.O. unit, specifically the input conduit 12. Since this conduit is substantially depressurized at the end of a purifying cycle, this arrangement would provide satisfactory results and is contemplated by this invention.

Turning now to FIG. 7, a modified R.O. unit, incorporating the control valve for controlling pressurization of the flush accumulator is illustrated. To facilitate the description, components and passages in the cartridge assembly which correspond to individual components and conduits in FIGS. 2 and 6 are accorded the same reference characters suffixed by an apostrophe ('), and some of the passages illustrated are shown slightly out of position.

The modified cartridge includes a modified intermediate housing member 242' and a modified top end cover 204'. Like the embodiment illustrated in FIGS. 3–5, the top cover 204' defines integral permeate, drain, and inlet fittings; however, only a modified inlet fitting 208' is shown. As seen in FIG. 7, the modified fitting 208' defines a right angle passage 390 communicating at one end with the controller 110' and terminating in a threaded fitting at its opposite end. A web section 322 extends from the bottom of the fitting 208' to a top surface 204a' of the top cover 204. The intermediate housing member 242' defines a stepped cavity 330 including a narrow diameter portion 330a and a large diameter portion 330b opening into and communicating with the concentrate chamber 240. A similarly shaped, stepped spool member 332 is slidable in the cavity 230 and mounts a pair of O-rings 334, 336 by which the spool member sealingly engages the cavity 330. The upper end of the narrow diameter portion of the spool cavity communicates with pressure in the inlet fitting 208' by a feed pressure passage 340 which extends upwardly through the intermediate housing 242' and through the web section 322 forming part of the top cover.

The narrow diameter portion of the spool cavity 330 communicates with the drain region 250' through a conduit 342 formed in the intermediate housing member 242'. The narrow diameter portion also communicates with the accumulator pressure chamber 280 by a passage 344 which extends through the intermediate housing and the depending flange 256' to which the bladder 270 is clamped. The large diameter portion of the cavity 330 opens into and is in direct fluid communication with the concentrate chamber 240.

It should be apparent, that with the illustrated construction, the spool member 332 is urged downwardly by feed water pressure in the inlet passage 390 (communicated by the passage 340) and is urged upwardly by the pressure in the concentrate chamber 240. During a purifying cycle, concentrate pressure is relatively high and can be substantially equal to inlet pressure since the flow rates through the R.O. membrane are relatively small. Because the area on the spool to which concentrate pressure is applied is much greater than the area exposed to inlet pressure, the force generated by the concentrate is enough to maintain the spool 330 in the upper position as shown in FIG. 7. In this position, the narrow segment of the spool 332 communicates the drain region 250' with the accumulator pressure chamber 280 via the passages 342, 344. As discussed above, the flow path between these passages is established by a clearance or gap between the narrow segment of the spool member 332 and the inside of the cavity 330.

As explained above, when the system controller 110' shifts to terminate the communication of feed water to the feed tube 226, at the conclusion of a purifying cycle, the pressure in the concentrate chamber 240 immediately decreases due to the interconnection of the bypass conduits 160, 162 (shown in FIG. 6). The depressurization of the concentrate chamber 240 eliminates or substantially reduces the upwardly directed biasing force on the spool 332 (exerted on the large radial end face 316a shown in FIG. 6) and enables the feed water pressure exerted on the top radial face of the spool (designated as 316b in FIG. 6), as communicated by the passage 340, to drive the spool downwardly. In the lower position, the seal ring 334 isolates the drain passage 342 from the pressurizing passage 344. The downward displacement of the spool also allows the inlet pressure passage 340 to communicate with the pressurizing passage 344 causing the pressurization of the accumulator drive chamber 280. The pressurization of this chamber causes the permeate to be driven from the permeate chamber 100a' into the R.O. unit feed tube 226 via the check valve 156' and associated passage 154b'. It should be apparent that, when a purifying cycle is recommenced, the resulting pressurization of the concentrate chamber 240 drives the spool 330 upwardly to terminate the communication of feed water pressure to the accumulator drive chamber 280 while concurrently communicating the drive chamber with the drain region 250' allowing the drive chamber to discharge the accumulated feed water as the permeate storage chamber 100a' receives permeate.

The disclosed construction is intended to serve as a self contained reverse osmosis purifying package that requires little or no maintenance. Installation of a purifying system using the disclosed cartridge is greatly simplified; connecting to a storage tank, dispensing tap, drain and feed water source conduit are all that is necessary. The other components of the system are fully contained and virtually encapsulated within the cartridge. It is believed that the cartridge can be permanently sealed as by ultrasonic welding etc., and can be treated as a disposable item in that it can be simply discarded when the quality of permeate falls below acceptable standards. Most, if not all, of the parts forming the cartridge lend themselves to high speed fabrication techniques such as injection molding and therefore the overall unit is relatively inexpensive as compared to other commercially available purifying system components.

It also should be noted that the disclosed purifying system can be made part of a comprehensive water treatment system which may include not only reverse osmosis purification but water softening as well. The resulting modular construction of the system would enable simple replacement of worn or failed components such as the cartridge without requiring excessive down time for the overall system.

Although the invention has been described with a certain degree of particularity, it should be understood by those skilled in the art that various changes can be made to it without departing from the spirit or scope of the invention as hereinafter claimed.

I claim:

1. A system for purifying water utilizing a reverse osmosis process, comprising:
   (a) a reverse osmosis unit having an input for feed water to be treated and outputs from which concentrate and permeate are separately discharged;
   (b) pressure controlling means for maintaining predetermined fluid pressures at the concentrate output of the reverse osmosis unit;
   (c) pressurized storage means for storing permeate produced by said reverse osmosis unit;
   (d) system control means responsive to the quantity of permeate in said storage means and operative to terminate a purifying cycle by terminating the communication of feed water to the reverse osmosis unit when a predetermined quantity of permeate is stored in said storage means;
   (e) a flushing means for flushing said reverse osmosis unit with permeate when said purifying cycle is terminated, said flushing means including a flush accumulator for storing a predetermined quantity of permeate; and,
   (f) a flush control means including a means for pressurizing said accumulator with a fluid pressure when said purifying cycle is terminated whereby said stored permeate is expelled from said accumulator.

2. The apparatus of claim 1 wherein said flush control means includes a shiftable spool valve having first and second end faces each defining an effective pressure area, said first end face being smaller in area than the second end face and communicating with feed water pressure, said second end face communicating with pressure in the reverse osmosis unit such that during a purifying cycle, said reverse osmosis pressure generates a force on said spool valve sufficient to overcome the force generated by the feed water pressure.

3. In a system for purifying water utilizing a reverse osmosis process, a membrane flushing apparatus, comprising:
   (a) a flushing accumulator including a storage chamber for storing a predetermined quantity of permeate;
   (b) conduit means for communicating said storage chamber with an input to said reverse osmosis unit;
   (c) pressure control means for pressurizing the permeate in said flush accumulator to effect discharge of said permeate from said accumulator, said pressure control means including a valve member responsive to the pressure in said reverse osmosis unit and operative upon sensing a reduction in pressure in said reverse osmosis unit below a predetermined level to pressurize said permeate to a pressure sufficient to drive said permeate from said accumulator when said reverse osmosis unit is not operating in a purifying cycle.

4. An apparatus for purifying solvent such as water by reverse osmosis, comprising:
   (a) a housing defining an inlet for feed water to be treated, an outlet for permeate and an outlet for discharging waste;
   (b) a reverse osmosis membrane located in a compartment disposed within said housing including an input for receiving feed water to be treated, an output for permeate and an output for discharging concentrate;
   (c) an expansible chamber formed by an elastomeric member surrounding said membrane compartment including means for receiving permeate from said reverse osmosis compartment;
   (d) means for exerting a force on said elastomeric member tending to contract said expansible chamber, said means including a control valve mounted in said housing, responsive to pressure in said reverse osmosis compartment and operative, upon sensing a decrease in pressure below a predetermined level in said compartment, to communicate feed water under pressure from said inlet to a region on said elastomeric member, isolated from said expansible chamber, to produce a driving force to urge permeate from said expansible chamber.

5. Apparatus for purifying a solvent such as water by reverse osmosis, comprising:
(a) a substantially cylindrical housing having an end cover defining an inlet for water to be treated, and outlet for permeate, and an outlet for waste;
(b) a reverse osmosis module disposed axially within said housing, said module comprising:
  (i) an input tube disposed axially with respect to said housing;
  (ii) a perforate collector tube surrounding said input tube and defining a permeate collection region between the inside of said collector tube and the outside of said input tube;
  (iii) a reverse osmosis membrane disposed around the collector tube and extending into abutting engagement with an inside wall of said module;
(c) an intermediate housing member disposed intermediate said end cover and said reverse osmosis module, said intermediate housing member defining a plurality of fluid passages;
(d) a system controller disposed in said housing for controlling the communication of feed water at said inlet with said input tube;
(e) a flushing accumulator defined by a tubular elastomeric member clamped around said reverse osmosis module, a region on one side of said member defining a permeate receiving chamber and another region defined on another side of said member forming a pressurization chamber;
(f) a pressure control valve for controlling the pressurization of said other region defined by said elastomeric member, said control valve responsive to a decrease in pressure in said reverse osmosis compartment, and operative to communicate feed water pressure to said pressurization chamber to generate a force on said elastomeric member causing it to contract said permeate receiving chamber to cause said permeate to be discharged from said permeate receiving chamber into the input tube of said reverse osmosis compartment.

6. The apparatus of claim 5, wherein said pressure control valve includes a spool valve slidably mounted in a cavity formed in said intermediate housing, said spool shiftable between two positions.

7. The apparatus of claim 6, wherein one end of said cavity communicates with fluid pressure in said reverse osmosis membrane compartment and another end of said cavity communicates with said inlet.

8. The apparatus of claim 7, wherein said spool valve defines opposed effective pressure areas on opposite end faces communicating with respective ends of said cavity such that during a purifying cycle, the force generated on the end face communicating with said inlet is less than a force generated on the other end face by the pressure in said reverse osmosis module whereby said spool valve is maintained in a position at which feed water pressure at said inlet is blocked from said pressurization chamber defined by said elastomeric member.

9. A method for purifying water by reverse osmosis, comprising the steps of:
(a) providing a reverse osmosis unit having an input for feed water to be treated and outputs for discharging concentrate and permeate;
(b) communicating said permeate output with a pressurized storage means, during a purifying cycle;
(b) storing a predetermined quantity of permeate in a flushing chamber, the quantity of permeate storable in said flushing chamber being less than the quantity storable in said pressurized storage means;
(d) monitoring the pressure in said reverse osmosis unit;
(e) pressurizing said flushing chamber to drive out said permeate from said chamber upon sensing a drop in operating pressure in said unit;
(f) providing a fluid path from said flushing chamber to an input to said reverse osmosis unit when said permeate is being discharged.

10. The method of claim 9 wherein said step of pressurizing said flushing chamber is achieved by communicating feed water pressure to a pressurization chamber.

11. Apparatus for purifying a solvent such as water utilizing reverse osmosis, comprising:
(a) a reverse osmosis module including an input for receiving feed water to be treated, an output for permeate and an output for concentrate;
(b) system control means for controlling the communication of feed water to said module input;
(c) a flush accumulator incluidng a chamber for storing a predetermined quantity of permeate, and a presurization chamber adapted to receive fluid pressure under predetermined conditions, said pressurization chamber isolated from said permeate receiving chamber;
(d) a flushing control valve operative to communicate fluid pressure to said pressurization chamber upon sensing a predetermined reduction in pressure in said reverse osmosis module whereby said predetermined quantity of permeate stored in said flush accumulator is expelled and conveyed to said module input.

12. The apparatus of claim 11, wherein said control valve includes a spool member defining opposed effective pressure areas, one of said areas being in fluid communication with inlet pressure and the other of said areas being in fluid communication with fluid pressure in said reverse osmosis module.

13. The apparatus of claim 12, wherein said effective pressure areas defined by said spool valve are of a predetermined relative size such that during a purifying cycle, the force generated on the other of said effective pressure areas by the fluid pressure in said reverse osmosis module is greater than a force generated on the one effective pressure area by feed water pressure such that the spool member is maintained in a first position, during a purifying cycle, at which said pressurization chamber defined by said flushing accumulator is communicated with substantially ambient pressure.

14. The apparatus of claim 13, wherein said effective pressure areas are sized such that when the fluid pressure in the reverse osmosis module falls below a predetermined threshold, the feed water pressure becomes effective to overcome the force exerted by said module pressure such that said spool member is driven to a second position at which feed water pressure is communicated to said pressurization chamber whereby permeate stored in said storage chamber is discharged into the reverse osmosis input.

15. The apparatus of claim 14, wherein said reverse osmosis module, flush accumulator and flushing control valve are all located in a canister-like assembly.

* * * * *